May 20, 1969 G. M. PURDY 3,444,935
LAND SURFACE SHAPING APPARATUS
Filed July 12, 1966 Sheet 1 of 5

Fig. 1.

Glendon M. Purdy
INVENTOR.

BY Clarence A. O'Brien
and Harvey B. Jacobson
Attorneys

May 20, 1969  G. M. PURDY  3,444,935

LAND SURFACE SHAPING APPARATUS

Filed July 12, 1966  Sheet 3 of 5

Glendon M. Purdy
INVENTOR.

BY Clarence A. O'Brien
and Harvey B. Jacobson
Attorneys

Glendon M. Purdy
INVENTOR.

United States Patent Office 3,444,935
Patented May 20, 1969

3,444,935
LAND SURFACE SHAPING APPARATUS
Glendon M. Purdy, 509 S. 1st St.,
McGehee, Ark. 91654
Filed July 12, 1966, Ser. No. 564,570
Int. Cl. E02f *3/62;* A01b *61/04*
U.S. Cl. 172—780             11 Claims

ABSTRACT OF THE DISCLOSURE

A frame assembly having two longitudinally aligned sections hinged connected at confronting portions for swinging movement of the sections from a horizontal position to upwardly raised angular positions. An earth moving blade structure is connected to one frame section in a manner permitting the blade to ride over small obstacles. Contact between the blade and larger obstacles cause the aforementioned swinging movement of the plane sections which permits the blade to ride over these larger obstacles.

---

This invention generally appertains to improvements in land treating devices and, more particularly, relates to novel improvements in land surface working or shaping apparatuses, which are conventionally employed for land leveling, planing, clearing, and similar operations, all of which may be generally categorized as being surface shaping operations, which are performed to shape the surface of a cultivatable field.

There are many known land surface shaping apparatuses, which are employed for working the surface of a cultivatable field so as to work the surface into a level condition, whereby the entire surface lies in a common plane. These apparatuses are also used for leveling aircraft runways or any other large earth areas, where a level condition of the surface is desired. Other machines, which function in a similar manner, are used for spreading and working materials that may be placed on the surface of an area of ground for surfacing the area.

The present invention relates to improvements in such land surface shaping machines, which directly act on the ground or which act on materials that are disposed on and adapted to cover the surface of the ground.

Irrespective of the specific land treating operation, known apparatuses or implements generally comprise an elongated frame, which is in the form of a trussed structure and which has opposing front and rear ends that are supported by ground engaging wheel assemblies. The forward end, which is adapted to be attached by a tow or draft connection to a draft vehicle, is usually supported by a swivel caster wheel assembly. Intermediate the front and rear ends of the elongated frame, blade and/or associated bucket assemblies are disposed and are suspended from the underside of the frame and disposed substantially transversely thereof.

Such blade or blade and bucket assemblies usually are adjustable so as to be raised into various vertical positions, relative to the ground surface, whereby various depths or leveling of the surface can be carried out.

For a land surfacing apparatus or implement to work correctly it must be of considerably long length, which poses a problem in transportation and general maneuverability of the machine. The problem of transportation is encountered particularly in transporting the implement from field to field inasmuch as the land that requires leveling or treating usually lies in low areas through which railroad tracks pass, the railroad tracks being built on high embankments to keep the water from overflowing tracks to flood stages. Such embankments must be crossed in the transportation of the implements from field to field. With known implements, the blades, scrapers or buckets are mounted so that they can be moved, either rectilinearly or curvilinearly, in a vertical path relative to the underside of the elongated supporting frame. But, the upward movement thereof is limited by the underside of the frame and such movement is not sufficient so that high obstacles, such as the embankments, can be traversed or the deep sloughs which separate the fields can be crossed. Therefore, it is necessary for the implements to be drawn in a detoured route in order to gain access to another field or separated area from that which has been worked.

Free floating, spring-biased, blade assemblies are provided, in association with implements of this type, so that when the blade assemblies, which are suspended from the frame and disposed transversely of the longitudinal axis of the mobile frame, strike a ground obstacle, such as a short stump or stone, the blade assemblies can be swung upwardly to pass over the obstacle, without hanging up on the obstacle and causing damage to the blade, its mounting arrangement or the frame. However, this is not satisfactory because, while the blade will clear the obstacle, there will be a deleterious shock transmitted to the elongated blade supporting frame in the initial impact between the blade and the frame. Furthermore, the blade support structure and the elongated frame must be rather heavy and, because of the shock, the length of the frame must be correlated with the weight and shock factors. In addition, the movement of the blade assemblies is limited and, in the instance of large obstacles, the blade assemblies cannot ride thereover but become hung up and impose deleterious stress and strain on the supporting structure and the frame.

Accordingly, it is an important object of the present invention to provide a land surfacing or treating implement or apparatus, which is formed so as to overcome the drawbacks attendant with known implements of this type, as outlined briefly in the foregoing, and to provide a land surface implement which can be manufactured in a simple and expeditious manner and which will be sturdy and shock resistant in operation and require very little maintenance.

Another important object of the present invention is to provide a land implement of this type wherein the elongated frame can be longer than the frames of known implements and wherein the frame is composed of at least two sections having inner longitudinally aligned, adjoining ends, which are hingedly connected together so that the frame can be buckled or moved upwardly about the hinged inner ends, thereby reducing its overall length for transportation purposes.

In line with the foregoing object, it is another object of the present invention to provide means for moving said structure about the hinge connection therebetween and for attaching a supporting means for a blade, bucket or the like ground engaging, leveling or treating device, to the frame in the vicinity of the adjoining ends of the frame sections, whereby when the frame is swung upwardly about the hinge connection, the blade supporting means and the blades, buckets or the like can be raised to a considerable height above the ground so as to enable the same to pass over very high obstacles, such as embankments, or the like, when transporting the frame from one field to another.

Also, it is an important object of the present invention to provide a sectional frame, which is composed of at least two end to end hingedly connected sections, with the blade structure being suspended from the frame sections in the vicinity of their joined ends, whereby the blades or buckets can be automatically raised out of engagement with a vertical obstacle on the ground.

In this respect, it is a further object of the present invention to mount the blade or bucket so that it is free floating and is spring urged into ground engagement whereby it, in itself, will tend to give so as to ride over a small vertical obstacle and to also mount the support structure for the blade to the frame sections so that the force of the blocked blade, when it cannot, in and of itself and by its own mounting construction, swing and move over a vertical obstacle, will be transmitted to the frame sections and cause the frame sections to automatically hinge upwardly, thereby lifting the blades and support structure vertically so that the blades can clear the obstacle.

Another important object of the present invention is to provide a support structure for a blade assembly and to provide connection means for attaching the same at selected points along the longitudinal extent of the adjoining ends of the two sections of the frame, whereby the blades can penetrate the earth at adjusted depths and whereby the blade will be in scraping or digging relation with the ground at different levels, depending upon the particular placement of the blade support structure relative to the frame sections.

Another important object of the present invention is to provide ground engaging wheel assemblies for the outer ends of the frame sections, the outer end of one of the frame sections constituting the forward end of the entire frame, which is adapted to be connected to a draft vehicle, and the ground engagement wheel assembly wheel thereof being in the nature of a dolly and to provide novel means for mounting the dolly to the frame end in a manner so that the frame end and dolly can move relative to each other about combined vertical and longitudinal and transverse horizontal axes.

Another important object of the present invention is to provide an articulated frame, which is rather narrow and thin and which is formed from lightweight material and is of considerable length and which supports a transversely disposed blade or other ground treating structure, that extends laterally beyond the sides of the frame and which is carried by the adjoining hinged ends of the frame in such a manner that it can be deliberately or automatically, responsive to encountering of obstacles by the blade, hingedly or pivotally swung upwardly so as to raise the blade structure to desired heights above the ground surface.

Yet another important object of the present invention is to provide adjustable stop means between the inner adjoining, hinged or pivoted ends of the sections of the frame, whereby the hinge joint construction may be relieved or stress and strain and whereby a hydraulic motor, which is used to move the frame sections about their hinge connection can be relieved of pressure.

Another important object of the present invention is to provide a land clearing or similar implement, which is simply, dependably and inexpensively manufactured and which can be reliably and effectively operated for all types of ground surfacing, leveling, treating or planing tasks, and which is formed so that it has a universality of action and can be moved from place to place over uncleared land or on roads in a facile and quite simple manner.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Referring now more particularly to the accompanying drawings, the ground surface treating apparatus or implement 10, which can be used for performing various ground operations, such as clearing, leveling or planing or digging the surface, or for spreading materials over the surface, includes an elongated narrow frame 12, which is composed of at least two sections 14 and 16 having inner adjoining ends 18 and 20. The frame sections 14 and 16 are disposed in longitudinal alignment, so that the inner adjoining ends 18 and 20 are disposed in longitudinal alignment. The outer end 22 of the section 14, which may be defined as the rearward section is supported by a ground engaging wheel assembly 24 which is the rear wheel assembly for the frame. The outer end 26 of the frame section 16 constitutes the front end of the frame 12 and is supported by a ground engaging front wheel assembly 28 and is adapted to be connected to a suitable draft vehicle.

A ground working means 30 is supported by a support structure means 32, which is adapted to be attached to the underside of the frame 12 in the vicinity of the inner hinged or pivoted ends 18 and 20 of the frame sections 14 and 16.

The rear frame section 14 is formed as a trussed assembly and includes upper, longitudinally extending, transversely spaced members 34 and 36, which are suitably spaced by transverse brace bars and have inner parallel portions and outwardly diverging, downwardly extending end portions which are connected by a rear brace member 38 from which the rear wheel assemblies 24 swivelly depend by virtue of a swivel or rotatable connection 40.

Figure 1:
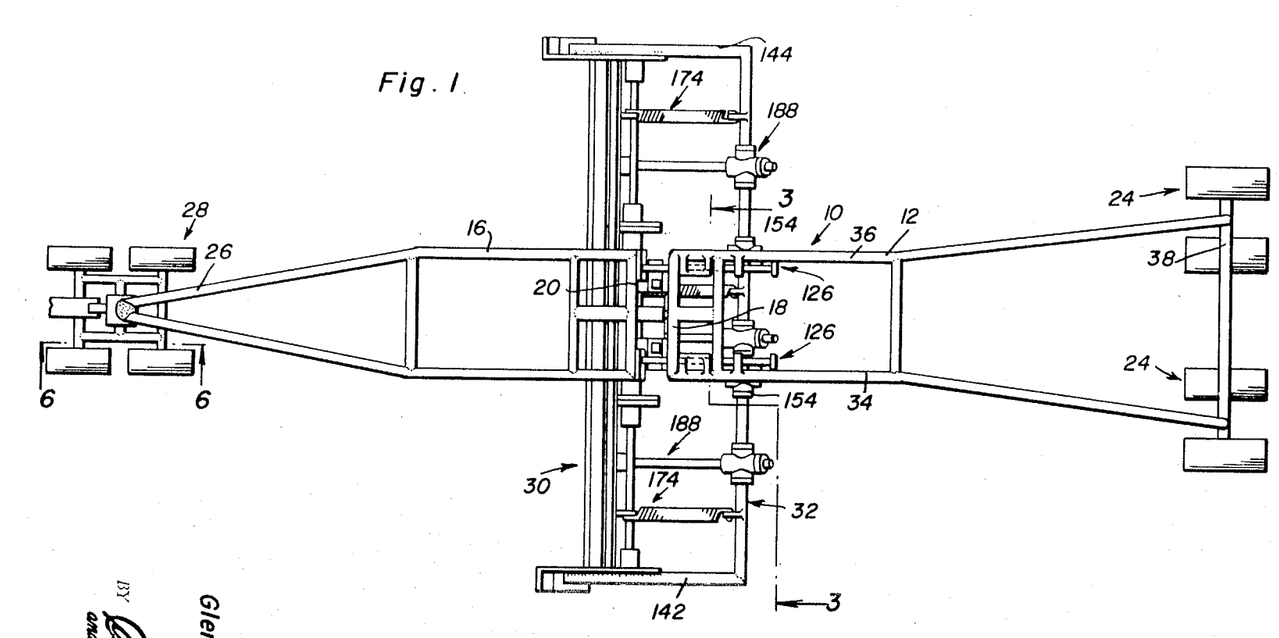
FIGURE 1 is a top plan view of a land surface implement, constructed in accordance with the principles of the present invention.
Figure 2:
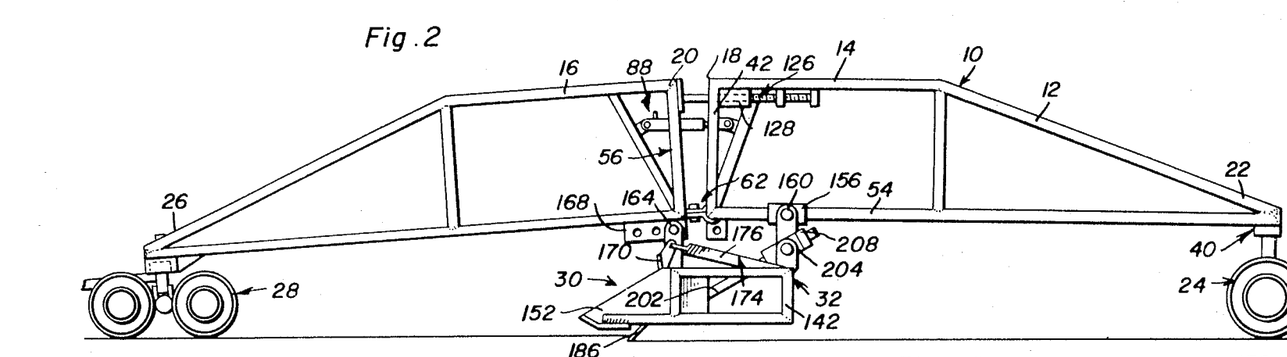
FIGURE 2 is a side elevational view thereof.
Figure 3:
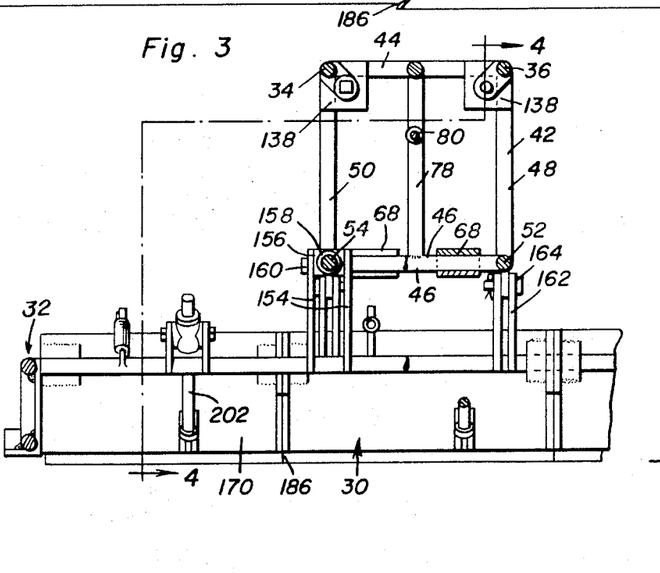
FIGURE 3 is an enlarged, vertical cross-sectional view, taken substantially on the line 3—3 of FIGURE 1.

The front or inner end 18 of the frame section 14 includes a framework 42, as shown in FIGURES 1 through 3. The framework 42 includes an upper transverse rod 44 and a lower transverse rod 46, the rods 44 and 46 being disposed in vertically spaced, parallel relation and being connected, at their outer ends, by vertical bars or rods 48 and 50. The outer ends of the longitudinally extending frame bars 34 and 36 are attached to the upper ends of the front end frame 42, defined by the interconnected rods 44, 46, 48 and 50 and the elongated frame section 14 also includes longitudinally extending bottom frame members 52 and 54, which underlie the upper elongated frame members 34 and 36.

The inner or rear end 20 of the trussed front frame section 16 is similarly formed and includes an open, substantially square framework 56, which includes upper and lower transverse brace rods or members 58 and 60, similar to the members 44 and 46 of the front end frame 42 for the rear frame section 14.

Hinge or pivot means is provided for hingedly connecting the adjoining ends 18 and 20 of the sections 14 and 16 of the frame together, whereby the frame sections are attached in tandem relationship so that the frame sections are disposed in longitudinal, end-to-end alignment, as shown in FIGURE 1. Such means serves to connect the frame sections together so as to form the elongated frame 12 and also serves as a hinge means, whereby the frame sections 14 and 16 can be raised from a normal lower position, wherein the frame sections are substantially coplanar into various raised angular, upwardly buckled relationships, as shown in FIGURE 5.

Figure 4:
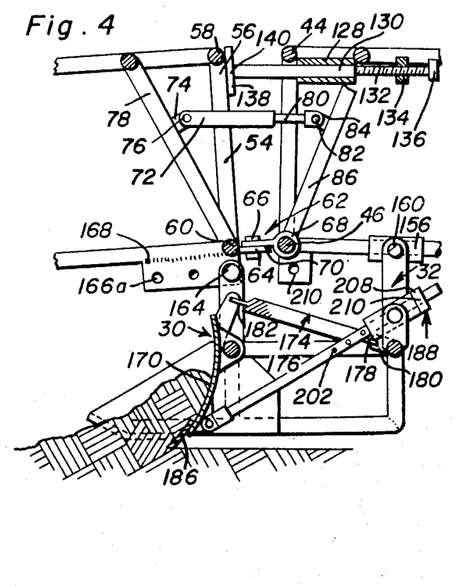
FIGURE 4 is a detailed, fragmentary longitudinal vertical sectional view, taken substantially on the line 4—4 of FIGURE 3.

The hinge or pivot means 62, as shown more clearly in FIGURES 3 and 4, includes a pair of straps 64, which are securely anchored or fastened to the lower, crossbar or rod 60 of the rear end 56 of the front section 16 and are disposed in transversely spaced relationship and project rearwardly therefrom. The straps 64 are formed with suitable, vertical openings to receive connecting pins 66. The hinge means 62 further includes collars 68, which are freely rotatably circumposed on the lower cross rod 46 of the front end 18 of the rear frame section 14 and which are provided with projecting straps 70 that are superimposed on the straps 64 and securely fastened thereto by the pins 66.

Figure 5:
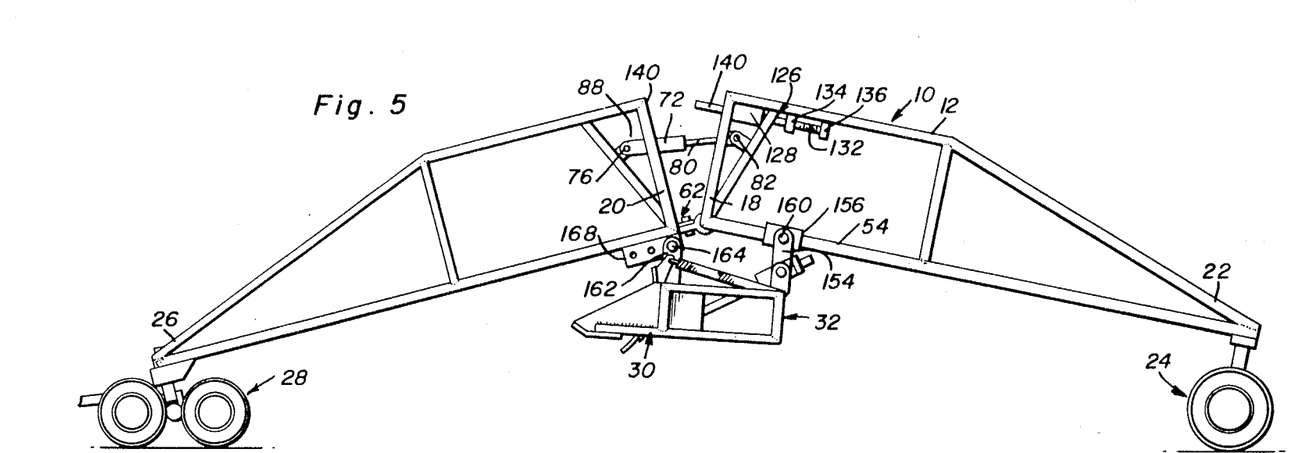
FIGURE 5 is a side elevational view, showing the frame in an upwardly buckled or raised position, with the adjoining hinged ends of the frame sections in raised positions, while the outer ends have their wheel assemblies retained in ground engaging positions.
Figure 11:
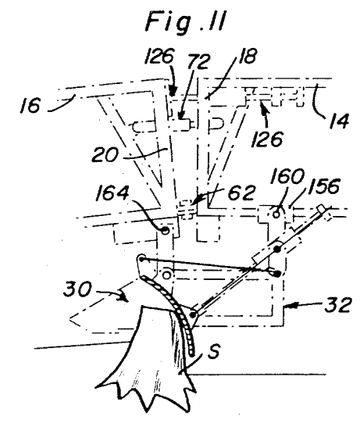
FIGURES 11 and 11a are diagrammatic views, showing how the frame sections buckle upwardly, automatically, when the blade encounters a rather large vertical ground obstacle that cannot be passed over by the floating action of the blade itself.
Figure 11A:
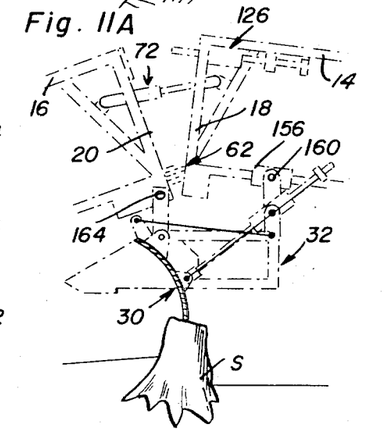

Thus, the adjoining ends 18 and 20 of the frame sections 14 and 16 are hingedly or pivotally connected by means of the hinge means 62, with the collars 68 rotating relative the cross rod 46 of the front end 18 of the frame section 14 and permitting the adjoining ends 18 and 20 to swing upwardly from the normal position of FIGURE 2 into selected jackknifed or upwardly buckled positions, such as shown in FIGURE 5 and diagrammatically in FIGURE 11a.

Means is provided for effecting a deliberate hinging movement of the adjoining ends of the frame section about the hinge means 62, as when it is desired by the operator of the draft vehicle (not shown) to shorten the overall length of the elongated frame 12 for transportation purposes and to raise the suspended blade assembly 30 and its supporting means 32 whereby the same may be positioned at any desired height above the ground so that the frame can be moved over embankments or the like during its transportation from one field to another.

Such means includes a hydraulic cylinder 72, which has its rearward end pivotally attached to an ear 74 by means of a pivot pin 76. The ear 74 projects rearwardly from a diagonally disposed, vertical brace bar 78 at the rearward end 20 of the front section. A piston rod 80 is workingly disposed within the cylinder 72 and has its outer end pivoted, as at 82, to a projecting ear 84 on a diagonally positioned, vertically disposed brace bar 86 provided at the front end 18 of the rear frame section 14. Actuating fluid is admitted to the cylinder 72 through the inlet connection 88, with the connection 88 being connected by suitable conduit means (not shown) to the hydraulic system of the draft vehicle.

Thus, at the volition of the operator of the draft vehicle, suitable valve means can be easily actuated whereby the hydraulic means will be rendered operative so as to extend the piston rod 80 from the cylinder 72 and cause the adjoining ends of the frame sections 14 and 16 to pivot or swing about the hinge means 62, with the outer ends 22 and 26 of the frame sections being drawn inwardly toward each other.

In the latter respect, the ground engaging wheels 24 of the rear frame section 12 will be constantly maintained in ground engagement and are connected by the swivel connection means 40 to the rear end 22 and are rotatable about an axle means, in conventional fashion. The front end 26 is supported by the dolly wheel assembly 28, which is shown in more detail in FIGURES 6 and 7.

Figure 6:
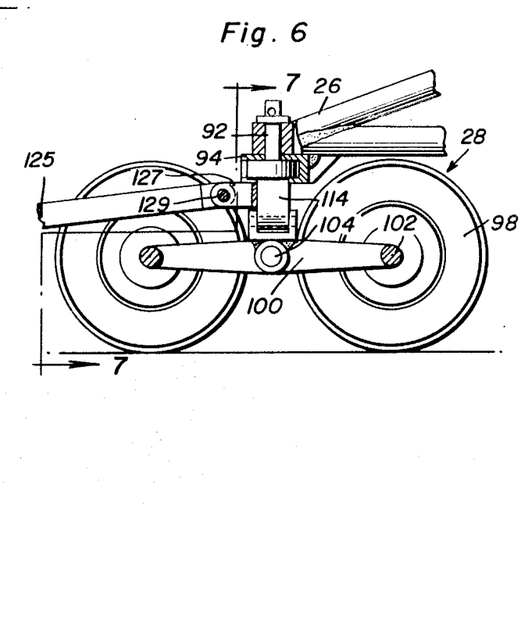
FIGURE 6 is an enlarged, side elevational view, partly in section, of the wheel assembly for the front end of the frame.
Figure 7:
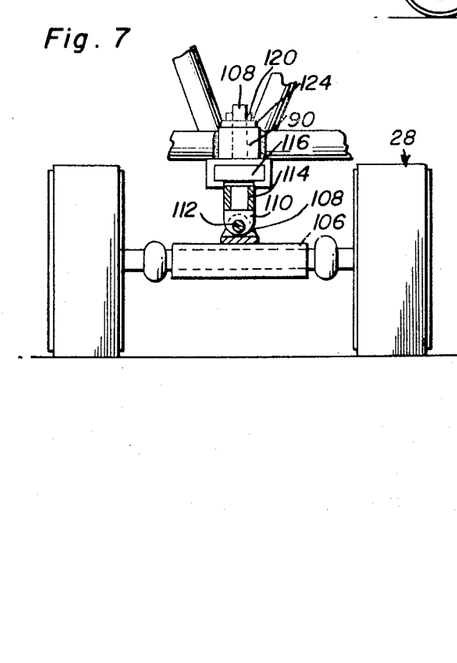
FIGURE 7 is a transverse, vertical sectional view taken substantially on the line 7—7 of FIGURE 6.

As shown in FIGURES 6 and 7, the front or outer end 26 of the front frame section 16 terminates in a vertically disposed, annular journal block 90, having an axial bore 92 formed therethrough. Secured to the underside of the block 90 is a bearing collar 94. The wheel assembly 28 includes a side by side pair of tandem wheels 98, the wheels of each pair being connected by a rocker arm 100 that carries the axles 102 for the wheels and which is provided intermediate its ends, with a cross-connecting rod 104 that connects the pair of arms 100 for each of the side-by-side tandem wheels of the dolly wheel assembly 28. The rod 104 is rotatably disposed within a sleeve 106 from which a clevis 108 upstands and is adapted to receive a companion clevis 110 pinned thereto by a longitudinally extending, horizontally disposed pivot pin 112. The clevis 110 is formed integral with the lower end of a cylindrical attaching member 114 that has a bearing enlargement 116 formed thereon and rotatably disposed within the bearing collar 94. An upper journal end 118 of the member 114 is disposed within the bore 92 of the bearing block and is held therein by a pin 120 or suitable, similar fastening means that bears on a spacer or washer 124.

Thus, the wheels are always maintained in ground engagement, irrespective of the planar relationship of the two sections 14 and 16 of the elongated frame, as shown clearly in FIGURES 2 and 5. The outer end 26 of the forward or front frame section 16 can move about a transverse horizontal axis, defined by the rotating collar 106 freely circumposed on the cross rod 104 between the locking arms of the two tandem wheel assemblies. In addition, the upper end can pivot about a longitudinally disposed, horizontal axis, which is defined by the pivot pin 112. Thus, the end 26 can pivot about horizontal axes, which extend longitudinally and transversely of the frame and the forward end can move about a vertical axis, which is defined by the member 114 in rotatable bearing relation with the collar 94 and the journal block 92 that is carried by the outer end of the frame section. The mounting of the annular bearing member 116 in the collar 94 and the fastening of the upper journal end secures the dolly support structure to the outer end 26 of the front frame section, while permitting the frame section and the dolly assembly to rotate about a vertical axis, relative to each other.

A tow or draft bar 125 is attached to ears 127 by a transverse pivot pin 129, with the ears being carried by and extending forwardly from the front of the member 114 that is rotatably connected for rotation about a vertical axis, to the outer end 26 of the front frame section 16. The tow bar can move the dolly wheel assembly 28 about a vertical axis, relative to the frame, in drawing the frame, whether in a normal planar position of the sections, as showns in FIGURE 2, or in an upwardly swung position, as shown in FIGURE 5.

When the hydraulic motor means is activated so as to spread the inner ends of the sections away from each other and move the sections about the hinge means 62, it can be seen that the rear ground engaging wheels 24 and the front wheel dolly assembly 28 will move toward each other, as the outer ends 22 and 26 of the respective frame sections are drawing inwardly toward each other. The wheel assembly 24 will constantly remain in ground engagement, as shown in FIGURE 5, while the dolly wheel assembly 28 will maintain the wheels thereof in ground engagement, irrespective of the angular relationship of the frame section 16 to the wheels, by virtue of the multiple pivot connections, whereby the dolly wheel assembly and the front end section have a universal movement, with the frame section 12, so that the frame section being movable about horizontal and vertical axes, the horizontal axes extending longitudinally and transversely of the frame.

Means is provided for relieving the pressure head on the hydraulic motor and is in the nature of an adjustable stop means 126 operatively disposed between the adjoining ends 18 and 20 of the frame sections 14 and 16. The stop means 126 is adjustable so as to secure the sections in any set angular relationship that they may be placed by operation of the hydraulic motor, whereby the fluid pressure head on the piston of the motor can be relieved, since the weight will be borne by the adjustable stop means 126. The adjustable stop means 126 includes a sleeve 128, which is suitably fixed to the front end portions of the upper, longitudinal frame bars 34 and 36, as shown in detail in FIGURES 1 through 4. The sleeves 128 have open ends and are adapted to slidably receive a rod 130, which has a coaxially reduced outermost shank portion 132 that is externally threaded and is passed through an internally threaded opening in a locking nut 134 which is fixedly carried by the longitudinal frame members 34 and 36, rearwardly of the front end portion 18 thereof. An adjusting head 136 is formed on the outer end of the shank 132 and constitutes means whereby the shank can be threaded forwardly and rearwardly within the nut 134, thereby moving the rod end 140 forwardly and rearwardly, with respect to the end 18 of the frame section 14.

The adjustable stop means 126 further includes abutment plates 138, which are formed at the upper corners of the rear end 20 of the front frame section 16. The outer, free ends 140 are adapted to abut the plates 138 and, consequently, maintain the adjoining ends of the frame sections in a preset angular relation, so as to maintain the frame in the desired position.

In this respect, as will be further described with respect to the blade and bucket assembly 30 and the support structure 32 therefor, the adjustable stop means 126 is provided to maintain a uniform depth of the cut of the blade or similar device in the ground. The elongated screw 132 can be rotated to back the rod 130 rearwardly in the sleeves 128. The hydraulic motor can then be actuated by the operator, through any suitable control means, so as to spread the sections apart about the hinge means 62 and raise the inner ends 18 nad 20 of the sections upwardly to the desired degree, with respect to the depth of the cut that is to be made in the ground by the blade and bucket assembly 30. The screws 132 can then be rotated to bring the abutment ends 140 into firm abutment with the abutment plates 138.

The load is carried by the adjustment rods 130 of the rear section 14 and the abutment plates 138 of the front section 16, so that fluid pressure of the hydraulic motor can be completely relieved. The weight will ride on the abutment or stop plates 138 and the piston within the cylinder 72 will not have a pressure head behind it but will be free floating. This is of importance in the automatic hinging action of the frame sections, as will be explained hereinafter.

With respect to FIGURES 2–4 and 8 and 9, it is to be noted that the support structure 32 for the blade 30 is provided so that the blade is suspended from the frame sections in a vicinity of the hinge means 62 and that the frame structure 32 is adjustable longitudinally with respect to the frame sections and the entire frame 12 so as to enable the blade assembly 30 to perform various ground surface clearing, digging, leveling or the like operations.

The support structure 32, which is suspended from the underside of the frame 12, includes substantially vertically disposed end frame members 142 and 144, which are connected together by parallel connecting frame members or rods 146 and 148. The frame rods or members 146 and 148 connect the laterally spaced vertically disposed frame members 142 and 144 and are disposed transversely of the elongated frame 12, so that the ends 142 and 144 are positioned at a considerable distance laterally out beyond the sides of the rather thin, elongated frame 12, as can be appreciated from a consideration of FIGURE 1.

Figures 8, 9:
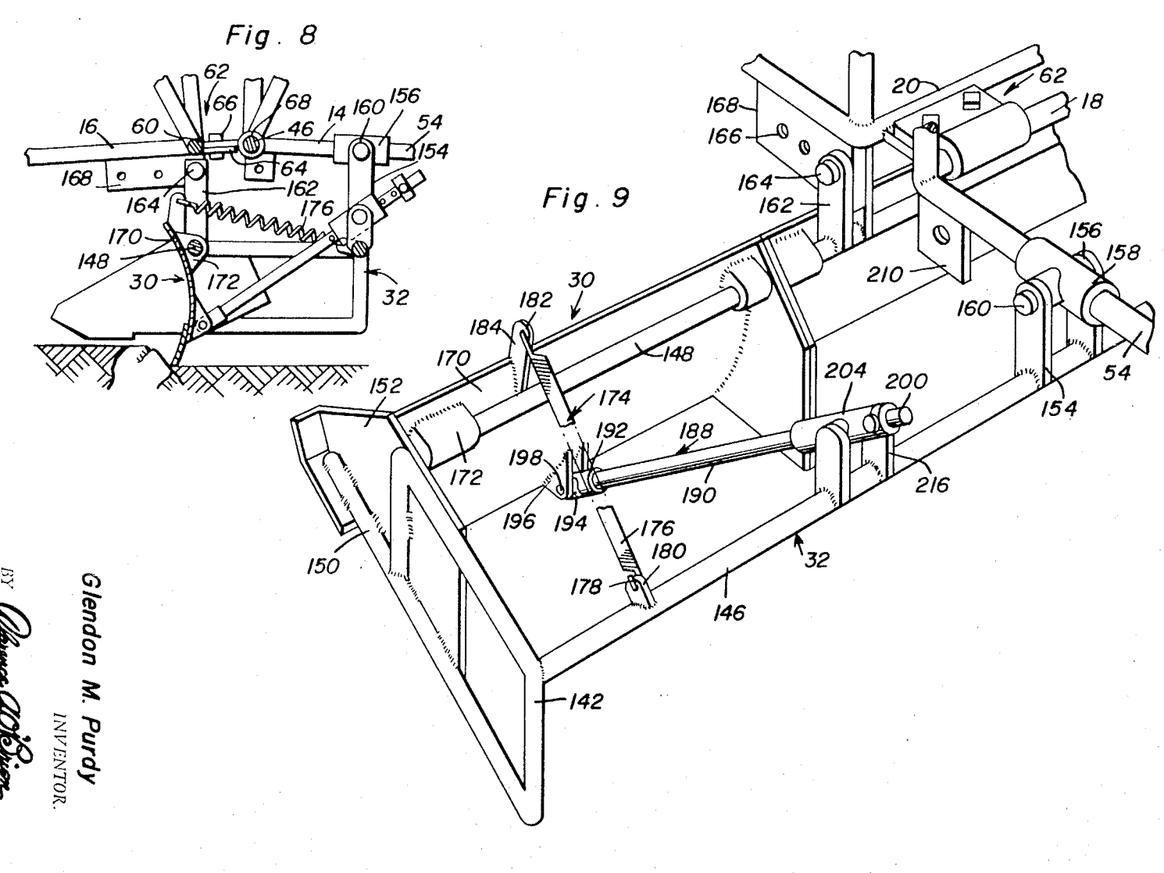
FIGURE 8 is a detailed elevational view, partly in section, showing the free floating mounting arrangement of the blade or bucket on the support structure therefor and showing the manner of attachment of the support structure to the frame sections.
FIGURE 9 is a detailed, fragmentary perspective view of the blade support structure and blade and mounting arrangement thereof on the support structure.

As shown in greater detail in FIGURE 9, each of the vertical end frame members or sections 142 and 144 of the frame structure 142 has a lower projecting end 150, to which plow shares 152 are affixed so that they project forwardly therefrom.

The transverse connecting rod 146 is provided, intermediate the vertical end sections 142 and 144 of the frame structure 32, with upstanding spaced pairs of cooperating arms 154. The upper ends of the pairs of arms 154 are securely fastened, in immobile fashion, to lateral projections 156 on a tubular sleeve 158 by means of fastening pins 160. The sleeves 158 are freely slidable on the lower longitudinal frame support rods 52 and 54 of the rear frame section 14, as shown in FIGURES 3, 4 and 9.

The front, cross rods 148 of the support structure 32 are provided with fixed, upstanding spaced pairs of arms 162, which are apertured to receive a pivot pin 164, that is adapted to be inserted in any one of the longitudinally spaced apart apertures 166 formed in attachment plates 168 that depend from the rear end portions of the lower, longitudinal frame bars for the front frame section 16.

It can be appreciated that, as the adjoining ends of the frame sections 14 and 16 are spread apart, about the hinge means 62, the support structure 32 will be lifted bodily upwardly, with the rearward end 20 of the front frame section 16 pivoting about the pivot points, defined by the pins 164, and the sleeve 158 sliding freely on the frame rods 54 toward the rear end of the rear section of the frame. The arms are rigid with their associated crossbars 146 and 148 of the support structure 32 for the blade 30 and the support structure is lifted bodily from a position, such as shown in FIGURE 2, into a position, as shown in FIGURE 5. The hinge means permits the adjoining ends of the frame sections to move or swing upwardly, in a curvilinear manner, relative to each other, while such movement is accommodated also by the pivot connection 164 between the support structure 32 and the rear end of the front frame section and the sliding sleeve arrangement between the front end of the rear frame section and the rigid pair of rearward arms 154.

It is contemplated that the support structure 32 can be adjusted longitudinally, with respect to the adjoining ends of the frame sections, for effecting certain work operations and for permitting the blade 30 to function under certain ground conditions, as will be explained in more detail, particularly with respect to FIGURES 4, 12 and 13.

The blade assembly 30 includes an arcuate blade 170, which is formed on the rearward portion, adjacent its upper edge with bearing blocks 172 that are freely circumposed on the cross rod 148 of the frame support structure 32, whereby the blade is mounted at the front of the support structure and extends transversely thereof between the plow shares 152 that are rigid with the vertical sides 142 and 144 of the frame structure 32. The blade is mounted for rotative movement and is held in ground engaging position, as shown in FIGURE 4, by resilient means 174.

The resilient means 174 includes extremely strong, retraction springs 176, which have hook ends 178 anchored to ears 180, which are formed integral with the cross rod 146 and are positioned so that they are disposed upwardly and forwardly therefrom. The front hook ends 182 of the springs are attached to upstanding ears 184 on the upper ends of the blade, adjacent the outer end portions thereof. In this respect, the springs 176 function to urge the lower cutting edge 186, which is replaceable, into engagement with the ground, as shown in FIGURE 4.

The blade is of the spring-biased, free floating type, since it is free to rock around the rod 148 by virtue of the bearing mounts 172 and has its lower edge 186 held in ground leveling or digging relationship with the earth's surface by means of the retraction springs 176.

Figure 10:
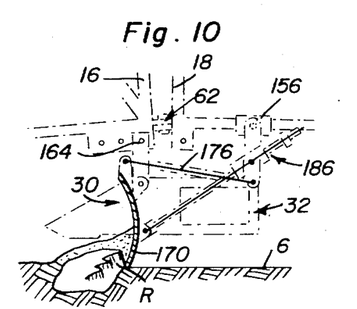
FIGURES 10 and 10a are diagrammatic views, showing the manner in which the blade, due to its attachment to the support structure therefor, can automatically pass over a small vertical obstacle on the ground.
Figure 10A:
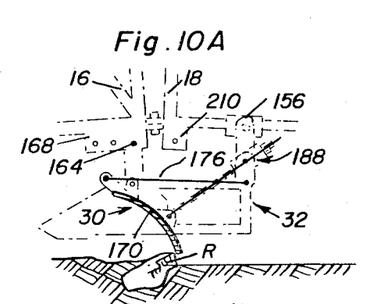

Guide means is provided for guiding the blade rearwardly, in the event that the blade should strike an obstacle, as shown in FIGURES 10 and 10a and as will be more fully explained. The guide means 188, as shown in more detail in FIGURE 9, includes elongated rods 190 that have lower ends socketed in attaching members 192, which terminate in flattened terminal portions 194. The end portions 194 are disposed between a pair of ears 196 secured, as by welding or the like, in spaced fashion to the rear face of the blade, just above the replaceable lower cutting edge 186 thereof. The end is secured within the ears of each pair 196 by a transverse pivot pin 198.

The outer end portion 200 of each adjustment rod 190 is formed with a series of radial openings 202 which are disposed in spaced relation along the longitudinal axis of the rod, with the end portion 200 being slidably disposed within a supporting sleeve 204 that is pivotally carried by a pair of upstanding ears 206 suitably fastened in vertical positions on the cross rod of bar 146 of the frame structure 32. A stop collar 208 is fixedly circumposed on the end portion 200 of the rod 190 and is held in place by a pin 210 that is disposed through one of the selected openings 202.

In this manner, the blade is free to pivot in a counterclockwise direction about the pivot axis, defined by the cross rod 148, so that the blade can be tripped when the lower cutting edge 186 strikes an obstacle, as will be explained, and the blade can swing forwardly to permit the lower edge to ride over the obstacle, with the rods 190 sliding rearwardly in the sleeves and the springs 176 being extended.

The stop collar 208 limits the retracting action of the spring 176 and serves to position the blade in desired vertical relationship with the ground surface, while the rod 190 also serves as a guide means during the pivotal movement of the blade so as to ride over a ground obstacle. In such manner, the blade is mounted in a free floating fashion.

The foregoing can be best appreciated from a consideration of FIGURES 10 and 10A. As shown in FIGURES 10 and 10A, the blade is functioning to level the surface of the ground G, with the frame sections disposed in their normal, orientated positions, as shown in FIGURE 2, wherein the sections are in substantially coplanar relationship. The lower edge of the blade 170 is shown in FIGURE 10 as coming in contact with a small ground obstacle R, such as a rock that has a portion thereof extending above the surface of the ground. The blade can ride over the obstacle R, as shown in FIGURE 10A, by virtue of its pivotal mounting, with the springs being extended and the guide means being operative to guide the forward swinging movement of the blade, as the lower edge rides over the obstacle R, as shown in FIGURE 10A.

However, in many instances, land that is to be cleared has large vertical obstacles, such as protruding stump S, shown in FIGURES 11 and 11A. In such respect, the floating action of the blades will not be sufficient to enable the blade to ride over the obstacle S and the blade will strike the obstacle S and halt the forward movement of the frame. However, such will be only momentary and no damage will be imparted to the blade support structure 32 or the frame sections, since the force will be transmitted, instantaneously, from the blade to the support structure and to the hinged ends 18 and 20 of the frame sections. Of course, the hydraulic motor is in an idling state, since there is no pressure in the hydraulic cylinder. The blade bucket assembly, when it comes in contact with the stump will cause the impact to be transferred to the frame sections, and the frame will hinge open at the adjoining ends about the hinge means 62 and lift the support structure 32 and blade and bucket assembly 30 to a sufficient vertical height, so that the lower edge of the blade will ride over the stump obstacle S, while the weight stays on the wheel assemblies 24 and 28, since the frame sections will be in an angular position, somewhat similar to that of FIGURE 5, the upward lift of the support structure 32 and blade and bucket assembly 30, depending upon the height of the obstacle S. In any event, the frame sections will automatically buckle or swing upwardly about the hinge means 62 so as to eliminate bending and breaking of the support structure 32 and the blade and bucket assembly 30.

In this respect, the support structure 32 and the trusslike construction of the frame sections 14 and 16 can be much lighter and the length increased considerably since there is no shock factor, as would be the case in conventional implements, where even with a free floating blade, similar to that shown in FIGURES 10 and 10A, the blade would become hung up on the obstacle.

It is to be noted that the bucket and blade assembly, constituted by the support structure 32 and the blade mounting assembly, is formed so that the same straddles the hinge joint 62 and that the attachment plate 168 is formed with longitudinally spaced apertures 166 to receive the pivot pin 164. The purpose of this is to permit longitudinal adjustment of the frame structure 32, with respect to the inner hingedly connected adjoining ends 18 and 20 of the frame sections 14 and 16 for various working conditions. The pin 164 can be easily removed and placed in one of the selected apertures 166 of the attachment plate 168 with the sleeve 156 freely sliding on the associated frame support, so as to accommodate such selected placement of the pin 164. Thus, the frame structure 32 will straddle the hinge joint and be movable longitudinally backward or forward on the frame 12 so that the amount of force pushing up on the hinge means or joint 62 can be controlled by the selected placement of the support structure 32 in accordance with the desires of the operator dictated primarily by the condition of the field to be surfaced or cleared.

Figure 12:
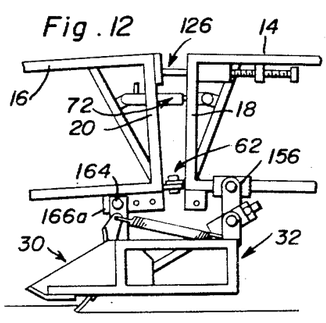
FIGURE 12 is a diagrammatic side elevational view, showing the blade support structure, in a position, wherein a shallow cut in the ground is obtained and showing the connection means, whereby the blade or bucket can be adjusted longitudinally with respect to the frame and the frame sections; and, FIGURE 13 is a diagrammatic side elevational view of the adjoining ends of the frame sections, showing the support structure for the blade attached to the front of the rear section whereby a deeper cut may be made in the ground.
Figure 13:
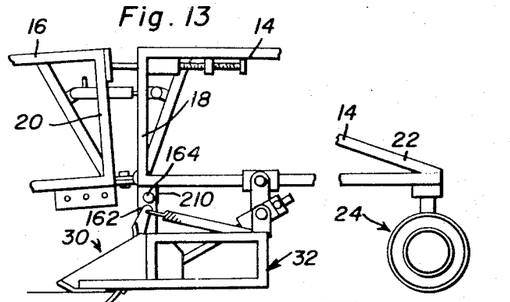

If the ground is very unlevel and has many mounds and high stumps, which create a hazardous working condition, the attachment arms 162 will be desirably fastened by the pins 164 to the forwardmost hole or aperture 166a, as shown in FIGURE 12. In this position, the frame will tend to hinge more freely as the backward and upward thrust will be near the hinge joint 62.

When working in less hazardous fields, the support structure 32 can have its attachment arms 162 pinned in one of the more rearward apertures, as shown in FIGURE 4, so that more dirt can be carried without the frame sections tending to unhinge more rapidly and quickly, as the backward and upward thrust would be further from the hinge joint.

It is also intended that the arms 162 can be attached by the pins 164 to apertured attachment plates 210, which depend from the front ends of the lower longitudinal frame bars 52 and 54 of the rear frame section 14. In such position, as shown in FIGURE 13, the support structure 32 and the bucket and blade assembly 30 are completely detached from the front frame section 16 and are entirely supported by the rear frame section 14.

Thus, the blade will function the same as a rigid frame plane with the tractor or traction vehicle pulling the blade forward so that the blade cutting edge engaging the ground creates a backward and upward force and the tractor pulling on the tow or hitch bar means 125 will create an upward force that keeps the hinge joint 62 closed to point that the rear wheels 24 will be completely lifted off the ground the same as in the case when a rigid plane is pulled over the ground.

Accordingly, the implement of the present invention has the efficiency of a rigid frame, but, at the same time, has the adaptability of the hinged frame sections so that the sections can automatically open, under certain operating conditions.

Furthermore, the sections can be purposely unhinged by the hydraulic motor, so as to lift the support structure 32 and blade and bucket assembly 30 to any desired height above the ground, when the implement is being pulled over open, uncultivated fields. The blade and bucket assembly will be raised to a height where they will pass over any obstacles, as the frame is pulled by a draft vehicle or tractor over the fields.

In addition, the frame sections can be hinged upwardly, so as to bring the front and rear wheel assemblies inwardly toward each other, whereby the length of the frame will be reduced. This will permit the frame to be reduced to a length, for transportation on public roads, which would be within the regulatory limits.

It is also to be noted that the two sections can be readily uncoupled, by removing the connection pins 66 between the straps of the hinge joint 62, so that the two sections can be separated from one another and towed independently or in side-by-side relation over a public road.

The foregoing is considered as illustrative only of the principles of the invention since numerous modifications and changes will readily occur to those skilled in the art.

What is claimed as new is as follows:

1. A land surface shaping implement comprising an elongated frame composed of at least two separate frame sections arranged in longitudinal alignment and having inner adjoining, longitudinally aligned ends and having outer ends, ground engaging wheel assemblies supporting the outer ends, means for workingly engaging the earth carried by said frame and suspended therefrom adjacent the adjoining ends of the frame sections, means for attaching said earth engaging means to said frame in the vicinity of the inner adjoining ends of the frame sections, and means hingedly connecting the adjoining inner ends of the sections of the frame together permitting upwardly diverging swinging movement of said inner ends about an axis transverse to the longitudinal axis of the frame upon exertion of a preselected minimum force against said earth engaging means produced by relatively large obstacles encountered on the earth surface.

2. The invention of claim 1, wherein said means for attaching the earth engaging means is suspended and adjustably positioned along the longitudinal extent of the frame within the vicinity of the inner ends of the frame sections thereby varying the preselected minimum force necessary to cause the swinging movement of said inner ends.

3. The invention of claim 2, wherein said means for workingly engaging the earth includes an earth working element, said means for attaching the earth engaging means including connection means between the frame and the support structure for said earth working element, said support structure being disposed below the frame and arranged transversely thereof and extending laterally beyond the frame on opposite sides of the frame, said earth working element being pivotally carried by the support structure, means connected between the support structure and the earth working element for releasably retaining the earth working element in working position and including resilient means and guide means connected between the earth working element and the support structure, whereby said earth working element is normally held in a set earth working position with respect to the support structure and the frame and is adapted to swing relative to the support structure so as to ride over encountered obstacles on the earth surface and then automatically be returned to its normal set earth working position.

4. The invention of claim 2, wherein said means for workingly engaging the earth includes a suport structure arranged transversely of the frame and extending laterally beyond the sides of the frame, said means for attaching the earth engaging means including connection means between the frame and the support structure and a free floating earth working element carried by the support structure.

5. The invention of claim 4, wherein said connection means between the frame and the support structure includes longitudinally adjustable means connected between the sections of the frame and the support structure.

6. The invention of claim 5, wherein said longitudinally adjustable means includes a removable pivot connection between one of the sections of the frame and the support structure, said pivot connection being adjustable along the length of said frame section and a sliding means on the other of said frame sections, said sliding means being freely slidable longitudinally of said frame section and means fixedly attaching the support structure to said sliding means.

7. The invention of claim 1, and means connected between said inner ends for selectably moving said inner ends apart about the hinged connection whereby said sections are buckled upwardly and outwardly with the outer wheeled ends of the frame sections drawn closer together in a longitudinal direction while retaining ground contact.

8. The invention of claim 7, wherein said means for moving the inner ends apart includes a hydraulic cylinder piston assembly pivotally connected between said ends.

9. The invention of claim 8 and adjustable stop means carried by the inner adjoining ends of the frame sections for suporting said sections in adjusted raised angular positions with the pressure on the piston released.

10. The invention of claim 1, wherein said ground engaging wheel assembly for the outer end of one of the sections includes a dolly wheel assembly, means attaching the dolly wheel assembly to the frame section end for movement thereof about a vertical axis and means attaching the dolly wheel assembly to the frame section for relative movement of the frame section and wheel assembly about a longitudinal and a transverse horizontal axis.

11. A land surface shaping implement comprising an elongated frame composed of at least two separate frame sections arranged in longitudinal alignment and having inner adjoining, longitudinally aligned ends and having outer ends, ground engaging wheel assemblies supporting the outer ends, means for workingly engaging the earth carried by said frame and suspended therefrom adjacent the adjoining ends of the frame sections, means for attaching said earth engaging means to said frame in the vicinity of the inner adjoining ends of the frame sections, and means hingedly connecting the adjoining inner ends of the sections of the frame together for connected upward swinging movement of said inner ends about an axis transverse to the longitudinal axis of the frame, said means for attaching the earth engaging means being adjustable along the longitudinal extent of the frame relative to the frame and the sections thereof whereby the earth engaging means may be suspended from the frame in selected positions along the longitudinal extent thereof within the vicinity of the inner ends of the frame sections, said means for workingly engaging the earth including an earth working element, said means for attaching the earth engaging means including connection means between the frame and the support structure for said earth working element, said support structure being disposed below the frame and arranged transversely thereof and extending laterally beyond the frame on opposite sides of the frame, said earth working element being pivotally carried by the support structure, means connected between the support structure and the earth working element for releasably retaining the earth working element in working position and including resilient means and guide means connected between the earth working element and the support structure, whereby said earth working element is normally held in a set earth working position with respect to the support structure and the frame and is adapted to swing relative to the support structure so as to ride over encountered obstacles on the earth surface and then automatically be returned to its normal set earth working position.

References Cited

UNITED STATES PATENTS

| | | | |
|---|---|---|---|
| 2,015,880 | 10/1935 | Wold | 37—129 |
| 2,493,565 | 1/1950 | Arps | 172—734 X |
| 2,806,306 | 9/1957 | Peterson | 172—780 |
| 3,141,250 | 7/1964 | Eddins | 172—780 |
| 3,266,181 | 8/1966 | Olafson | 172—780 |

ABRAHAM G. STONE, *Primary Examiner.*

S. C. PELLEGRINO, *Assistant Examiner.*

U.S. Cl. X.R.

172—264